Dec. 3, 1957     J. M. BROOKE     2,815,393
TREATMENT OF SPENT ALKYLATION ACID CATALYST
Filed April 29, 1954
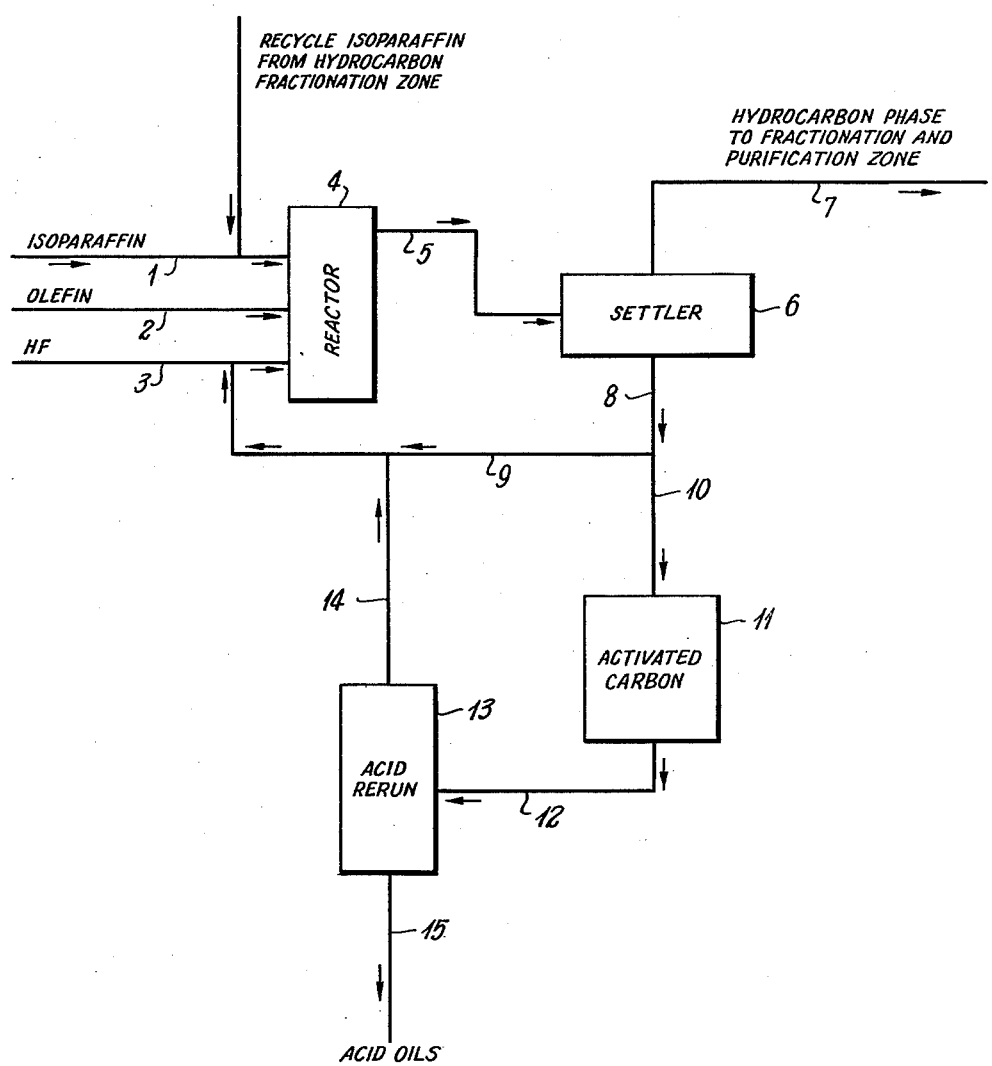
INVENTOR.
*J. M. Brooke*
BY
*Hudson ~ Young*
ATTORNEYS United States Patent Office 2,815,393
Patented Dec. 3, 1957

2,815,393

TREATMENT OF SPENT ALKYLATION ACID CATALYST

Jesse M. Brooke, Sweeny, Tex., assignor to Phillips Petroleum Company, a corporation of Delaware Application April 29, 1954, Serial No. 426,525

10 Claims. (Cl. 260—683.4)

This invention relates to the alkylation of hydrocarbons. In one of its aspects it relates to an alkylation employing hydrofluoric acid as a catalyst wherein low-boiling acid-soluble oils are removed from the used catalyst acid by contacting the same with activated carbon to convert the low-boiling acid-soluble oils to high-boiling oils. Other aspects and advantages of the invention are apparent from a study of this disclosure, the drawing, and the appended claims.

In the alkylation of isoparaffins with olefins and in the alkylation of other hydrocarbons with olefins or other hydrocarbons, for example, the alkylation of aromatics with olefins and/or even with isoparaffins employing hydrofluoric acid as a catalyst, there is obtained in the used catalyst so-called acid-soluble oils, some of which are low-boiling and some of which are relatively higher boiling. In the acid treatment to which at least a portion of the acid is at least intermittently but preferably continuously subjected, a problem arises when attempting to remove the low-boiling oils employing a so-called acid rerun treatment in which the acid is removed by distillation from whatever acid-soluble oils are present therein. It has been found, according to this invention, that there is a substantial quantity up to as high as five percent, and in some cases somewhat more, of acid-soluble oils boiling below about 300° F. This quantity of low-boiling acid soluble oils is not removed in the acid rerun treatment. I have found that if the acid is contacted with activated carbon, even at ordinary temperatures, that the said low-boiling acid-soluble oils are converted or polymerized to higher-boiling oils which can be removed in the acid rerun treatment.

Therefore, according to this invention, there is provided in a process for the alkylation of hydrocarbons with hydrofluoric acid as a catalyst, in which alkylation the hydrofluoric acid becomes contaminated with catalyst-soluble oils which are not ordinarily removed by an acid rerun treatment to which the said acid is subjected, the step of subjecting the acid containing said catalyst-soluble oils to contact with activated carbon to convert said catalyst-soluble oils to higher-boiling material which can be removed in an ensuing acid rerun or distillation operation.

Thus, according to this invention, catalyst-soluble oils contained in a used hydrofluoric acid catalyst are converted to higher-boiling catalyst-soluble oils, which are readily removable from said acid, by contacting said acid containing said acid-soluble oils with activated carbon in a manner and under conditions set forth and described herein.

The drawing shows diagrammatically an alkylation of an isoparaffin with an olefin employing substantially anhydrous hydrogen fluoride or hydrofluoric acid as a catalyst.

The operation comprises a treatment of acid which has been separated from converted hydrocarbon by passing it into contact with activated carbon according to the invention as more fully described below.

Referring now to the drawing, an isoparaffin stream containing substantially only isobutane is fed through conduit 1 into reactor 4. An olefin stream which contains substantially only butylenes but which may contain some propylene and some amylene is fed by way of conduit 2 also into reactor 4. Hydrofluoric acid catalyst of suitable concentration but which is preferably substantially anhydrous is fed by way of conduit 3 into reactor 4. In reactor 4 the isoparaffin, olefin and acid catalyst are contacted preferably with some agitation to cause alkylation to occur.

The conditions in reactor 4 can be those which are well-known in the art and in this instance, preferably will be a ratio of acid-to-hydrocarbon 0.3 to 1.0 up to 2.0 to 1.0, preferably about 1 to 1; a ratio of isoparaffin-to-olefin 3.0 to 1.0 up to about 10 to 1, preferably approximately 7 to 1; a reaction time from about 1 to 30 minutes, preferably from about 5 to 10 minutes; a reaction temperature of from about 35 to about 200° F., preferably about 75 to about 125° F.; and a pressure preferably sufficient to maintain substantially all of the reactants in liquid phase admixed with the liquid acid. Following reaction, the reactor contents are passed by way of conduit 5 into acid settler 6 wherein a hydrocarbon phase which is formed above an acid phase is removed through conduit 7 for hydrocarbon fractionation and purification as now practiced in the art. The hydrocarbon fractionation and purification are not shown in the drawing for sake of simplicity. The hydrocarbon fractionation and purification form no part of the present invention except that the present invention is incorporated into the overall production of alkylates of various kinds which, following their production, are usually fractionated and purified. From acid settler 6 the acid phase is withdrawn by way of conduit 8 and passed through conduit 9 to conduit 3 and into reactor 4 for reuse as is well-known in the art.

The acid settler can be one which is conventional in the art and in the illustration is one which is conventional in the art. In the acid settler, substantially the same temperature and pressure as employed in the reactor will prevail. Some drop in pressure between the reactor and acid settler will, of course, occur as is understood in the art.

Therefore, a pump is ordinarily employed to circulate the acid from the acid settler back to the reactor. Indeed, as will be understood by those skilled in the art, pumps, valves, valve and flow controllers, etc. are omitted from the diagrammatic drawing for sake of simplicity. These can be supplied by the skilled routineer. In accordance with the invention, some or all of the acid from acid settler 6 can be passed by way of conduit 8 and conduit 10 to activated carbon treating unit 11. This unit consists of at least one but preferably at least two containers or columns substantially filled with activated carbon which is commercially available and which is prepared by known methods. Conditions of temperature and pressure in unit 11 will be substantially those prevailing in the acid settler and a sufficient time of contact is employed. According to this invention, the time of contact is short. Thus, at room temperature in less than about one hour, the low-boiling catalyst-soluble oils are converted or polymerized to readily removable higher-boiling material whereas in the absence of carbon, soaking at room temperature for as high as 48 hours gives no measurable conversion or polymerization to readily removable material. When two or more activated carbon units are employed, continuous operation is effected by alternately feeding the acid stream in conduit 10 to one of the units while the other unit is undergoing regeneration. Regeneration can be accomplished by reactivating the carbon according to known methods. The activated carbon-contacted catalyst, now containing readily removable catalyst-soluble oils or material is withdrawn from unit 11 and passed by way of conduit 12 to acid rerun unit 13 in which acid is separated from non-acid material, the acid is passed by way of conduit 14 to conduit 9 for return to the reactor, and acid-soluble oils with some other material are withdrawn through conduit 15 for disposal.

The conditions in the acid rerun unit are those conventionally employed and in the instance described preferably will be a temperature of 200–375° F., still more preferably 225–350° F., measured in the liquid which reaches the highest temperature in the rerun unit; and a pressure of 50–170 pounds per square inch gauge, still more preferably 90–150 pounds per square inch gauge.

Certain advantages stemming from the employ of activated carbon according to the process of this invention will be apparent to those skilled in the art. Among these there can be cited the economy of equipment accomplished because the activated carbon unit can be of simplified construction and need not be large in view of the relatively short residence time for conversion or polymerization of the low-boiling soluble-catalyst oils to higher-boiling material. Further, it is noted as a particular advantage of this invention that the treatment with activated carbon is accomplished at ordinary low temperatures and that it can also be accomplished at the temperature prevailing in the acid settler. Therefore, no change of the temperature of the acid stream from acid settler 6 is required to be made.

Data showing the operation of a conventional rerun system as compared with the operation of an activated carbon-contacting unit ahead of a conventional rerun system, in the alkylation of isobutane with $C_4$ olefins, i. e. butylenes, are shown below.

*Conventional rerun system (pounds/hr.)*

|  | From Acid Settler | Rerun O. H. | Rerun Btms. |
|---|---|---|---|
| HF | 10,500 | [1] 10,375 | 125 |
| $H_2O$ | 214 | 118 | 96 |
| Light Oil (below 300° F.) | 936 | 834 | 102 |
| Heavy Oil (above 300° F.) | 194 | 76 | 118 |
| Gas | 366 | 366 |  |
| Total | 12,210 | 11,769 | 441 |

[1] Stream is 88.2% HF.

*Activated carbon system (pounds/hr.)—Room temperature*

|  | From Acid Settler | From Carbon Unit | Rerun O. H. | Rerun Btms. |
|---|---|---|---|---|
| HF | 10,500 | 10,500 | [2] 10,309 | 191 |
| $H_2O$ | 214 | 214 | 118 | 96 |
| Light Oil (below 300° F.) | 936 | 825 | 714 | 111 |
| Heavy Oil (above 300° F.) | 194 | 305 | 71 | 234 |
| Gas | 366 | 366 | 366 |  |
| Total | 12,210 | 12,210 | 11,578 | 632 |

[2] Stream is 89.0% HF.

Operating conditions for the rerun tower with and without the activated carbon unit were: tower top temperature 240° F., tower bottom temperature 330° F., and pressure 140 p. s. i. g. Operating conditions for the activated carbon unit were: temperature 80° F., pressure 140 p. s. i. g., contact time of 60 minutes, and ratio of acid to carbon of 1 to 1.

A comparison of the light oil obtained in the conventional rerun overhead with the light oil obtained in the rerun overhead following treatment with activated carbon shows a decrease of 120 pounds per hour of light oil in the rerun overhead (834 minus 714 equals 120).

Thus, it is seen that contact with activated carbon according to the invention at room temperature resulted in a very substantial decrease of light oil in the rerun overhead with a contact time of about 60 minutes.

A longer time of contact results in further conversion of additional quantities of light oil to higher-boiling oil. Without attempting to explain the theory according to which the invention may operate, it is clear that the activated carbon possesses a tremendous surface area which can shift whatever dynamic equilibrium may exist in the stream coming from the settler. In any event, it is clear that contacting with activated carbon, even at room temperature, considerably decreases light oil in the rerun overhead and increases the heavy oil in the rerun bottoms.

Since it is well known that catalyst-soluble oils are present in catalyst acid resulting from various alkylations, it is within the scope of this invention to treat said acid catalysts. Such acids can result from the alkylation of isoparaffins with olefins or an alkylation of aromatics with olefins and/or isoparaffins, etc.

While this invention has been described as employing activated carbon, as an alternative, activated charcoal can be employed, and therefore, is considered included within the scope of the appended claims.

Reasonable variation and modification are possible within the scope of the foregoing disclosure, drawing, and appended claims to the invention, the essence of which is that low-boiling catalyst-soluble oils contained in a hydrofluoric acid catalyst have been converted to higher-boiling material by contacting said acid with activated carbon.

I claim:

1. The treatment of a spent hydrofluoric acid alkylation catalyst to convert low-boiling catalyst-soluble oils therein to higher-boiling catalyst-soluble material which comprises contacting said acid under conditions which do not decompose said oils with activated carbon for a time sufficient to accomplish a desired extent of conversion of said oils to higher boiling oils, separating said catalyst from said activated carbon and subjecting the same to distillation, recovering a catalyst of reduced catalyst soluble oil content as distillate and a residue of higher boiling catalyst-soluble oils.

2. A treatment according to claim 1 wherein said acid is contacted with said activated carbon at a temperature in the range of from 35 to 200° F. and under a pressure sufficient to maintain substantially liquid phase operation.

3. A treatment according to claim 1 wherein said acid is contacted with said activated carbon at room temperature and under a pressure sufficient to maintain substantially liquid phase operation.

4. A treatment according to claim 1 wherein the contact with activated carbon is effected at room temperature and the time of contact is of the order of one hour when the catalyst has been used in an alkylation reaction in which the time of contact of the catalyst with the hydrocarbons being alkylated has been of the order of 1 to 30 minutes.

5. The removal from a spent hydrofluoric acid alkylation catalyst of low-boiling, catalyst-soluble oils therein which are otherwise difficultly removable therefrom, if at all, which comprises contacting said acid with activated carbon in a contacting zone under conditions which will not decompose said oils for a time sufficient to cause conversion of said oils to substantially higher-boiling oils which, however, are still catalyst-soluble and then removing said catalyst from contact with said activated carbon and in a distillation zone separating said higher-boiling, still catalyst-soluble oils from said catalyst by distillation, obtaining said last-mentioned oils as a distillation residue.

6. A treatment according to claim 5 wherein said acid is contacted with said activated carbon at a temperature in the range of from 35 to 200° F. and under a pressure sufficient to maintain substantially liquid phase operation.

7. A treatment according to claim 5 wherein said acid is contacted with said activated carbon at room temperature and under a pressure sufficient to maintain substantially liquid phase operation.

8. A treatment according to claim 5 wherein the contact with the activated carbon is effected at room temperature and the time of contact is of the order of one hour when the catalyst has been used in an alkylation reaction in which time of contact of the catalyst with the hydrocarbons being alkylated has been of the order of 1 to 30 minutes.

9. A treatment according to claim 5 wherein the contact with activated carbon is effected at a temperature of approximately 80° F.

10. The removal from a spent hydrofluoric acid alkylation catalyst containing an appreciable amount of water of low-boiling, catalyst-soluble oils therein which are otherwise difficultly removable therefrom, if at all, and which ordinarily distill over with the acid in a recovery distillation thereof, which comprises contacting said acid with activated carbon for a time sufficient to cause conversion of said oils to substantially higher-boiling oils which, however, are still catalyst-soluble, removing said catalyst from contact with said activated carbon, and then separating said higher-boiling, still catalyst-soluble oils from said catalyst by distillation, obtaining said last-mentioned oils as a distillation residue.

References Cited in the file of this patent

UNITED STATES PATENTS

| | | |
|---|---|---|
| 2,332,276 | Stahly | Oct. 19, 1943 |
| 2,477,038 | Bloch | July 26, 1949 |
| 2,507,764 | Carnell | May 16, 1950 |
| 2,570,925 | Eberle | Oct. 9, 1951 |

OTHER REFERENCES

I. G. F. (German) 630,249 (1936); abstracted in Berkman et al.'s text "Catalysis," Reinhold Publ. Corp., New York, 1940; page 978 relied on.